Figures 1, 2:
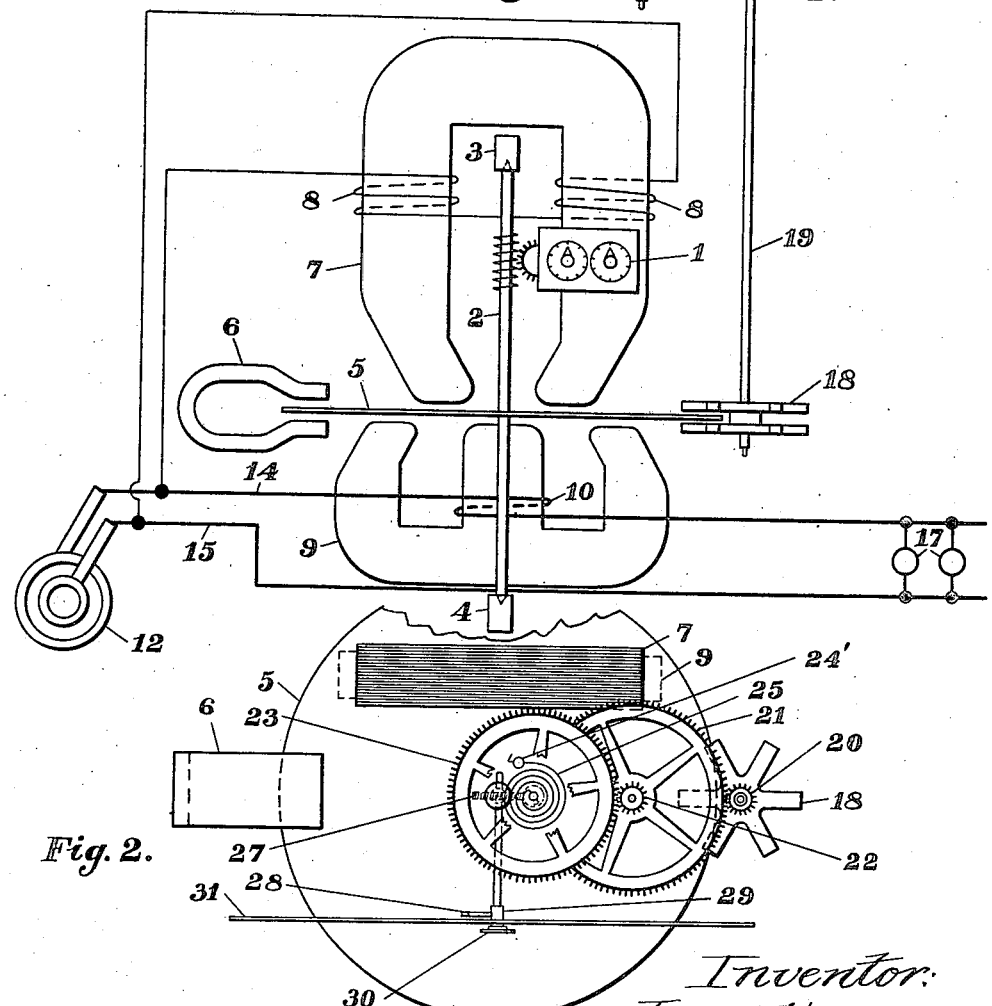

J. HARRIS.
MAXIMUM DEMAND WATTMETER.
APPLICATION FILED FEB. 2, 1920.

1,432,856.

Patented Oct. 24, 1922.

Inventor:
Jesse Harris,
By G. L. Cragg Atty.

Patented Oct. 24, 1922.

1,432,856

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

MAXIMUM-DEMAND WATTMETER.

Application filed February 2, 1920. Serial No. 355,612.

*To all whom it may concern:*

Be it known that I, JESSE HARRIS, a citizen of the United States, residing at La Fayette, in the county of Tippecanoe and State of Indiana, have invented a certain new and useful Improvement in Maximum-Demand Wattmeters, of which the following is a full, clear, concise and exact description.

My invention relates to that class of watt meters which employ mechanism for noting maximum rates of consumption of electrical energy and known to those skilled in the art as maximum demand watt meters. The meter of my invention may be adapted either to an alternating current circuit or to a direct current circuit. It employs a motor having current and pressure windings to turn the rotatable element of the motor proportionately to the wattage. Such a rotatable motor element may be employed, as hitherto, as an element of an integrating watt meter and also as the prime mover of the device of my invention so that one self-contained instrument will serve a two-fold purpose, namely, as an integrating watt meter and as a maximum demand noting watt meter.

Most integrating watt meters employ closed conductors in the form of metal discs. In a direct current meter such a disc is a damping disc. In an alternating current meter such a disc may serve the purpose of a damping disc and also act as a meter armature by placing it in inductive relation with current and pressure windings. I employ a revoluble permanent magnet system to operate the maximum demand noting mechanism, the revoluble disc of the motor element of the meter turning within the field of this revoluble permanent system, whereby such magnet system is revolved to operate a wattage indicator. An acuating element limited to advancing relation with the wattage indicator has separable engagement therewith so that it may be retracted from the wattage indicator which is frictionally or otherwise held in the positions to which it is advanced. Delay gearing is interposed between and operatively connects the revoluble permanent magnet system and the aforesaid actuating element, this gearing acting against the force of a windable spring whose maximum deflection is recorded by a pointer which is held by friction or otherwise in each advanced position thereof. By this arrangement a time interval, which varies according to the design and purpose of the meter, elapses before a maximum load is noted by the meter.

I will explain my invention more fully by reference to the accompanying drawing showing the preferred embodiment thereof as employed in connection with a system of alternating current distribution, Fig. 1 of the drawing showing the equipment of my invention somewhat diagrammatically in elevation; and Fig. 2 being a plan view illustrating structural parts appearing in Fig. 1.

Like parts are indicated by similar characters of reference in both figures.

The meter illustrated includes any suitable integrating or revolution counting mechanism 1 which is operated by the upright motor shaft or spindle 2 suitably supported at its ends in bearings 3, 4. Said spindle carries a closed conductor in the form of a disc 5, preferably made of aluminum. This disc may serve as an armature to constitute a part of the motive element of the meter and also preferably serves as an element of a damping device which turns in a constant magnetic field furnished by one or more damping permanent magnets 6 in accordance with common practice. The armature 5 is subject to potential magnetic flux passing therethrough from the poles of the U-shaped magnet core 7 that is perpendicular to and on one side of the armature disc 5 and is provided with the shunt winding 8. An E-shaped core 9 is perpendicular to and upon the other side of the armature disc. The middle leg of core 9 is wound with a current winding or coil 10 included in a main of the system. The pressure winding 8 is connected in parallel with the source 12. The mains 14, 15 extend from the source of current and constitute sides of a working or load circuit. Translating devices 17, such as incandescent lamps, are connected in bridge between the mains.

The meter described serves its original purpose of integrating the wattage but it is to be understood that my invention is not to be limited to the performance of this function by the motive element which I employ for noting maximum wattage.

A revoluble permanent magnet system 18 furnishes a magnetic field which threads the peripheral portion of the disc 5 that turns within this field. This revoluble magnet system preferably has an axis of rotation, furnished by the shaft 19, which is parallel with the axis of rotation of the motor element of the meter. The magnet system is capable of repeated complete revolutions in the same direction, being mounted to turn within a space that is not entered by the main rotating element 2—5 of the meter. A pinion 20 is provided at the upper end of the shaft 19 and is in mesh with a gear wheel 21 that is co-axial with and in fixed relation with respect to another pinion 22. A gear wheel 23 is in mesh with the latter pinion and is upon a shaft 24 connected to one end of a spiral spring 25 whose other end has a permanent anchorage as indicated at 24'. The worm 26 is upon the shaft 24 and is in mesh with a worm wheel 27 upon which is secured the actuating finger or element 28. This finger is behind and engageable with the post 29 upon the index or pointer 30 so that the finger may advance the pointer to note increased wattage and may recede from the post upon reduction of the wattage.

The meter disc 5, cutting the flux of the magnet 18, causes the rotation of this magnet with a torque proportional to the speed of the disc and this torque, through the medium of the train of delay gearing, is transmitted to the spring 25 which may be wound up until the torque furnished by the magnet system 18 through the delay gearing is balanced by the reaction or counter torque of the spring 25. The pointer 30, being related to the magnet system 18 as indicated, serves to indicate the maximum winding of the spring 25 and thus serves to note or register the maximum demand upon the system made by the consumer during more than a predetermined minimum interval of time. The pointer 30 may move over a reading scale 31, the pointer remaining in any position to which it is advanced by being frictionally or otherwise held.

While I have herein shown and particularly described the preferred embodiment of my invention I do not wish to be limited to the precise details of description shown as changes may readily be made without departing from the spirit of my invention, but having thus described my invention I claim as new and desire to secure by Letters Patent the following:—

In a maximum demand meter, the combination with a motor having current and pressure windings to turn the rotatable element of said motor proportionally to the wattage, the rotatable element of the motor including a closed conductor; a revoluble permanent magnet system within whose magnetic field a peripheral portion of said closed conductor turns to revolve the permanent magnet system, the space occupied or traversed by the permanent magnet system in rotating being clear of the space occupied by the aforesaid rotatable element of said motor whereby said magnet is permitted to rotate repeated revolutions in the same direction, a wattage indicator; an actuating element for advancing the wattage indicator to positions of higher indication and having separable engagement with the wattage indicator to permit reverse movement of said actuating element unaccompanied by the wattage indicator; delay gearing interposed between and operatively connecting the revoluble permanent magnet system and the aforesaid actuating element; and a spring against the force of which the permanent magnet system drives said actuating element.

In witness whereof, I hereunto subscribe my name this 29th day of January, A. D., 1920.

JESSE HARRIS.